Nov. 12, 1940.  R. P. HANNA  2,221,581
TROLLEY FIXTURE
Filed July 29, 1939   3 Sheets-Sheet 1
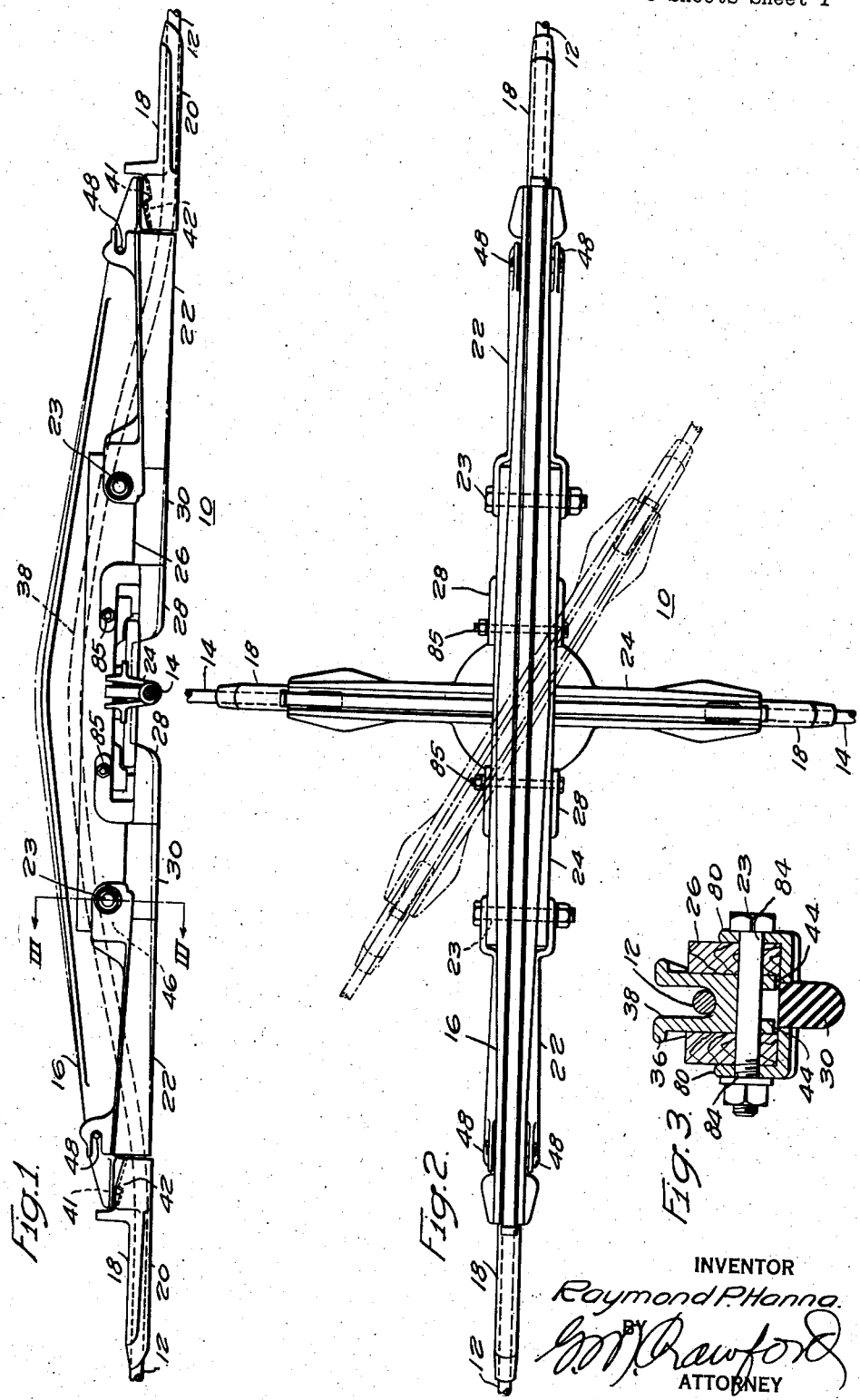
INVENTOR
Raymond P. Hanna.
BY
ATTORNEY

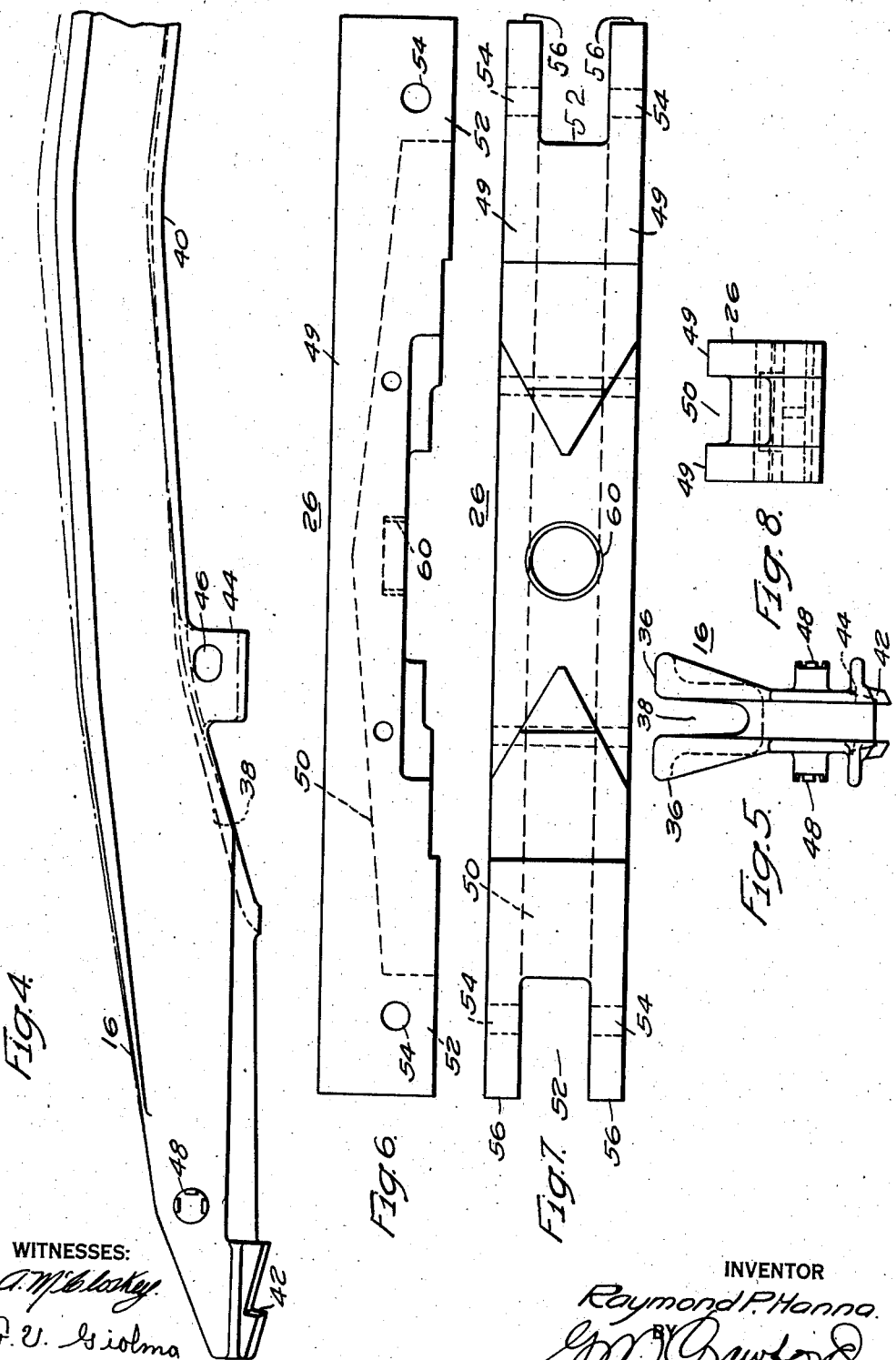

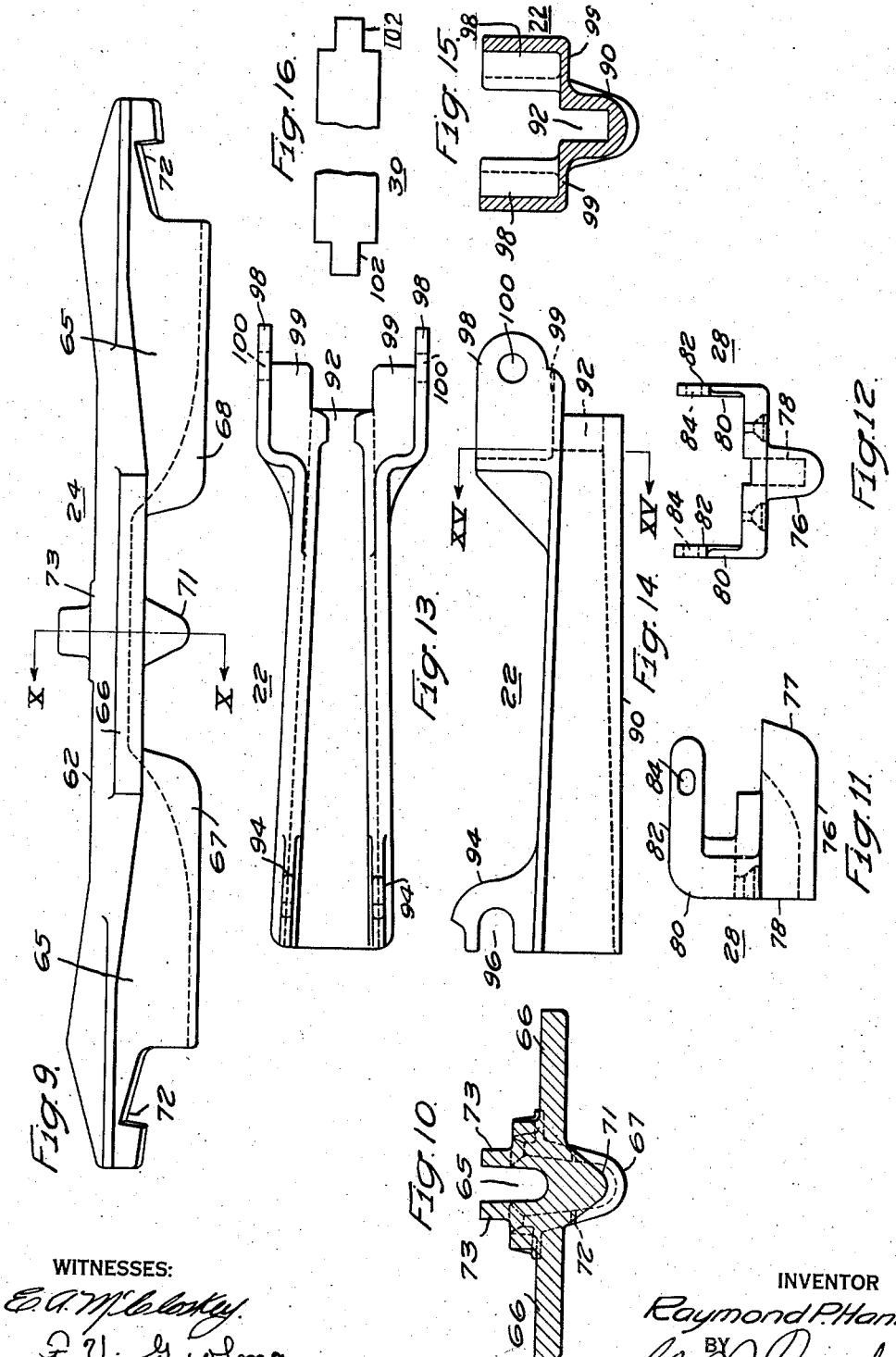

Patented Nov. 12, 1940

2,221,581

UNITED STATES PATENT OFFICE 2,221,581

TROLLEY FIXTURE

Raymond P. Hanna, Pittsburgh, Pa., assignor to Westinghouse Electric & Manufacturing Company, East Pittsburgh, Pa., a corporation of Pennsylvania Application July 29, 1939, Serial No. 287,258

11 Claims. (Cl. 191—37)

My invention relates, generally, to trolley fixtures, and it has reference in particular to trolley wire crossing fixtures for use in overhead trolley conductor systems.

Generally stated, it is an object of my invention to provide an adjustable trolley crossing fixture for a pair of intersecting trolley wires which are to be insulated from each other.

More specifically, it is an object of my invention to provide a trolley wire crossing fixture which may be adjusted so as to be useable at intersections of different angles for insulating the trolley wires from each other without subjecting the insulation to the usual incident mechanical stresses, so as to increase its life.

Another object of my invention is to provide for neutralizing the harmful effects caused by the deformation of the body member of a trolley wire fixture when the trolley wire is connected thereto, so as to provide for aligning the runner members associated therewith when the fixture is connected in the overhead trolley system.

A further object of the invention is to provide for the ready replacement of the runner members on a trolley wire fixture.

Still another object of the invention is to provide an interlocking relation between portions of the renewable wear members of a trolley wire fixture and portions of the body member thereof, so as to facilitate securing the runner members to the body member.

Another important object of the invention is to provide an adjustable angle insulated crossing fixture for overhead trolley wires that is simple and economical to manufacture, easy to install, and is efficient and serviceable in use.

Other objects will, in part, be obvious, and will, in part, be explained hereinafter.

In practicing my invention a trolley crossing fixture for effecting an intersection between a pair of trolley wires that it is desired to insulate from each other, may be provided with an elongated metallic member adapted to resist the stresses imposed thereon by a trolley wire connected thereto, for deflecting the one trolley wire over the other and maintaining the adjacent portions of the one trolley wire in the proper operating relation to the other trolley wire. The body member may be suitably shaped, and wear or runner members may be secured thereto in such a manner, that when the body member is subjected to the stresses occasioned by the deformation of the trolley wire connected thereto, the wear or runner members will be substantially in alignment.

An adjustable crossing member for positioning the other trolley wire may be pivotally associated with the body member being insulated therefrom by a member of suitable insulating material. The crossing member is maintained in the proper operating relation by the usual tension in the trolley wire, and the insulating member may be so supported that little or no strain is placed thereon.

Suitable guide members may be positioned on either side of the crossing member for providing renewable wear members, since the end portions of the runner members at each side of the crossing member adjacent the point of intersection are subjected to a relatively high degree of wear. Suitable insulating runner members may be interposed between the metallic wear or runner members and the guide members on each side of the crossing member, to insulate them from each other and insulate the metallic wear or runner members from the adjustable crossing member.

For a more complete understanding of the nature and scope of my invention, reference may be had to the following detailed description, taken in connection with the accompanying drawings, in which:

Figure 1 is a side elevation view of a trolley crossing fixture embodying the principal features of the invention;

Fig. 2 is a top plan view of the trolley crossing fixture of Fig. 1;

Fig. 3 is a cross-section view taken along the line III—III of Fig. 1;

Fig. 4 is an enlarged side elevation view of a portion of the body member of the trolley crossing fixture of Fig. 1;

Fig. 5 is an enlarged end view of the body member shown in Fig. 4;

Fig. 6 is a side elevation view of one form of insulating member used with the invention.

Fig. 7 is a bottom plan view of the insulating member shown in Fig. 6;

Fig. 8 is an end elevation view of the insulating member shown in Fig. 6;

Fig. 9 is an enlarged side elevation view of the adjustable trolley crossing member of the fixture of Figs. 1 and 2;

Fig. 10 is a section view taken along the line X—X of Fig. 9;

Fig. 11 is an enlarged side elevation view of one form of runner guide member of the fixture of Figs. 1 and 2;

Fig. 12 is an end view of the runner guide member shown in Fig. 11;

Fig. 13 is an enlarged plan view of one form of metallic wear member of the fixture of Figs. 1 and 2;

Fig. 14 is a side elevation view of the wear member shown in Fig. 13;

Fig. 15 is a section view taken along the line XV—XV of Fig. 14; and

Fig. 16 is an enlarged plan view of one form of insulating runner member used in the fixture of Figs. 1 and 2.

Referring particularly to Figs. 1 and 2, the reference numeral 10 may denote, generally, an adjustable angle insulated trolley wire crossing fixture for providing a smooth crossing between the intersecting trolley wires 12 and 14, which it is desired to insulate from each other.

In order to provide a smooth crossing between the trolley wires 12 and 14 without interrupting the continuity of the trolley wires, the trolley wire fixture 10 may be provided with suitable means, such as the elongated metallic body member 16 for positioning the trolley wire 12 so as to deflect it and carry it over the trolley wire 14, in spaced relation thereto. Suitable means, such as the end members 18, may be provided, having depending lips 20 which may be peened about the trolley wire to secure it to the body member 16 and maintain the adjacent portions thereof in the proper operating relation relative to the trolley wire 14.

In order to provide for guiding a current collector along the trolley wire 12, suitable means, such as the renewable metallic wear members 22 may be positioned along the lower side of the body member and secured thereto in any suitable manner, such for example, as by means of transverse bolts 23.

With a view to maintaining the trolley wire 14 in the proper operating relation to the trolley wire 12, an adjustable trolley crossing member 24 may be provided. The crossing member 24 may be secured to the body member 16 in any suitable manner, being for example, pivotally mounted on the lower side of the body member adjacent the central portion thereof, so as to be adjustable to different angular positions in the horizontal plane, such for example, as shown in dot and dash lines in Fig. 2. End members 18 of a well-known type may be utilized for securing the trolley wire 14 to the crossing member, having lips 20 which may be peened about the wire in the manner shown.

In order to insulate the crossing member 24 from the body member 16 an insulating member 26 of any suitable insulating material may be interposed between these members, in a manner hereinafter described in detail.

Renewable metallic runner guide members 28 may be positioned in alignment with the wear members 22 on each side of the crossing member 24, and insulating runner members 30 may be interposed between the runner guide members 28 and the metallic wear members 22, to insulate them from each other, and insulate the adjustable crossing member from the body member 16.

Referring particularly to Figs. 3, 4 and 5 of the drawings, it may be observed that the body member 16, may, for example, comprise an elongated body member of metal, having a substantially U-shaped cross-section with upstanding side walls 36 which define a central groove or channel 38 for receiving the trolley wire 12. The body member 16 may be substantially arched, the central portion 40 thereof being raised so as to provide for deflecting the trolley wire 12 over the trolley wire 14, and the end portions adjacent thereto sloping downwardly toward each end.

The end members 18, which may be of any well-known form, may be secured to the body member 16 in any suitable manner, being for example, provided with notched or recessed end portions 41. The body member 16 may be provided with corresponding recessed or notched end portions 42, interfitting therewith so as to interlock therewith and thus secure the trolley wire 12 in the proper operating relation in the groove 38 of the body member 16.

Suitable means, such as the depending ears 44, may be provided on the body member 16 for securing the insulating member 26 thereto. For example, the ears 44 may be positioned on the lower side of the body member adjacent the central portion thereof, and provided with elongated openings 46 therethrough, for receiving the bolts 23 which secure the runner members 22 and the insulating member 26 to the body member 16 and in operating relation to each other. The openings 46 may be elongated to allow limited movement of the bolts 23 therein and provide for securing the insulating member 26 to the body member 16 in floating relation. The body member 16 may thus be deformed without stressing the insulating member 26. Suitable means such as, for example, the laterally projecting lugs 48, may be provided for effecting an interlocking relation with portions of the wear members 22, in a manner which will be hereinafter described in detail.

Referring particularly to Figs. 6, 7 and 8, it may be seen that the insulating member 26, which may be of any suitable insulating material, such as wood, fibre, molded resin, or the like, may comprise an elongated body member having upstanding side portions 49 defining a central groove 50 along the upper side. Suitable slots or recesses 52 may be provided in the ends of the insulating member for receiving the depending ears 44 on the body member 16. Transverse openings 54 may be provided in the spaced end projections 56 which define the slots 52, for receiving the bolts 23, whereby the insulating member 26 may be secured to the body member 16. Suitable means, such as the wear bushing 60, which may comprise a length of tubing or the like, may be inserted in the lower side of the insulating member 26 for positioning the adjustable trolley crossing member 24, and protecting the insulating member from wear which might be occasioned by movement of the crossing member relative to the body member 16.

Referring particularly to Figs. 9 and 10, which are enlarged side elevation and cross-section views, respectively, of the adjustable trolley crossing member, it may be seen that this member may comprise a substantially channel-shaped elongated body member 62, having a groove 65 along the upper side thereof for receiving the trolley wire 14. The body member 62 may be provided with a bearing plate comprising the laterally extending flanges 66 positioned on opposite sides of the body member adjacent the central portion thereof. Suitable means, such as the runner portions 67 and 68 may be provided on the lower side of the body member for guiding a current collector therealong. A centrally positioned guide boss 71 may be provided between the spaced ends of the runner portions 67 and 68 to facilitate guiding a current collector through the intersection.

The end portions of the body member 62 may be suitably shaped for securing the end members 18 thereto, being, for example, provided with notched or recessed portions 72 for interlocking with correspondingly shaped portions on the end members 18 in the manner shown.

With a view to pivotally positioning the adjustable crossing member 24 relative to the body member 16 of the fixture, a bifurcated boss 73 may be provided on the upper side of the crossing member, which is adapted to be positioned in the wear bushing 60 of the insulating member 26.

Referring particularly to Figs. 11 and 12 of the drawings which are enlarged side elevation and end views, respectively, of the runner guide members 28, it will be observed that these guide members may comprise a runner member 76 with a gradually rounded end portion 77 and an interior recess 78 at the other end thereof. In order to secure the guide members 28 in the desired operating relation to the body member 16, they may be provided with the spaced apart arms 80, adapted to extend upwardly on either side of the insulating member 26. The arms 80 may be substantially L-shaped, as shown in Fig. 11, having horizontal portions 82 thereof which lie along the sides of the insulating member, and which have openings 84 therein for receiving the bolts 85 whereby the runner guide member may be secured to the insulating member so that the point of support is positioned along the axis about which it tends to rotate when struck by a passing current collector. In this manner the guide member may be simply and efficiently secured to the insulating member 26. By so positioning the runner guide members 28 that the rounded end portions 77 project over the laterally extending flanges 66 of the adjustable crossing member 24, the crossing member may be suitably retained in operating relation with the body member 16 of the fixture.

The details of the renewable wear members 22 are shown in Figs. 13, 14 and 15. With a view to increasing the life of the parts of the trolley crossing fixture which are most subjected to wear, the wear member 22 may be made of any suitable metal having good wearing qualities. The wear member 22 may, for example, comprise an elongated channel-shaped runner member portion 90 for guiding a current collector, having a recess 92 at one end for engaging an extension or projection on the insulating runner member 30. The wear member 22 may be secured to the body member 16 by means of the upwardly projecting ears 94, which may be hook-shaped, having a slot 96 therein for receiving the projecting lug 48 on the body member 16 to effect an interlocking relation between the wear member 22 and the body member 16 at one end. At the other end of the wear member, oppositely positioned upwardly projecting ears 98 may be provided at each side of the member. The ears 98 may be adapted to extend up about the end portion of the insulating member 26, and may be provided with substantially horizontal shoulder portions 99 which are adapted to engage the lower side of the insulating member 26 for assisting in supporting it. Openings 100 may be provided in the ears 98 for receiving the bolt 23, which secures the wear member and the insulating member 26 to the body member 16.

In order to insulate the metallic wear members 22 from the runner guide members 28 which engage the flanges 66 of the adjustable crossing member 24, suitable means such, for example, as the insulating runner members 30 may be provided. The insulating members 30 may, for example, comprise an elongated body member of any suitable insulating material having relatively good wearing qualities, and having a cross-section similar to that of the runner member portions 90 of the wear members 22. End projections 102 of reduced cross-section may be provided at each end for positioning in the recesses in the guide members and the runner member portions 90 of the wear members 22.

In assembling a trolley crossing fixture embodying the principal features of my invention, the body member 16 may be positioned with the trolley wire 12 in the groove 38 thereof. The end members 18 may then be placed in position with the notched end portions 41 engaging the correspondingly notched end portions 42 of the body member, and the lips 20 may be peened about the trolley wire, thus securing the body member 16 to the wire and positioning the adjacent portions of the trolley wire 12 in the proper relation to the trolley wire 14.

The adjustable trolley crossing member 24 may then be secured to the trolley wire 14 by positioning the wire 14 in the groove 65 and securing the end members 18 to the adjustable crossing member. The insulating member 26 may be positioned between the crossing member 24 and the body member 16, with the bifurcated boss 73 positioned in the wear bushing 60, and the upstanding side portions 49 positioned about the central portion 40 of the body member 16.

The runner guide members 28 may then be secured to the insulating member 26 by inserting the bolts 85 through the openings 84 in the arms 80, and through the insulating member. The insulating runner members 30 may be positioned with the end projections 102 thereof in the recesses 92 of the guide members 28. The renewable wear members may then be secured to the body member 16 by hooking the ears 94 about the laterally projecting lugs 48 on the body member, and then bringing the other end of the wear member up against the insulating member 26, and inserting the bolts 23 through the openings 100 in the ears 98, the openings 54 in the insulating member, and the openings 46 in the depending ears 44 of the body member 16.

Inasmuch as the body member 16 of the trolley crossing 10 is naturally subjected to bending stresses by the trolley wire 12, which is deformed from its free position, it will be realized that when the body member 16 is connected in an overhead trolley system, deformation thereof results. Since it is essential in modern high-speed trolley systems to provide the maximum possible smoothness in the current collector guiding portions, such deformation, as it results in a corresponding change in the relative positions of the runner members positioned on the body member 16, is greatly detrimental to the proper operation of the overhead system in which it is used. The runner members tend to become bowed or warped out of alignment with each other, and a "rough spot" results.

In order to neutralize the harmful effects of the deformation of the body member of the trolley fixture when it is subjected to bending stresses by the trolley wire being connected thereto, the runner members may be purposely provided with a slight angular difference between them, measured in a vertical plane. The body member may be initially provided with an additional amount of bow, or the wear members may be secured thereto at a slight angle, or both means may be used to attain the result. For example, by so shaping the body member 16 that in the free position it has the shape outlined by the dot and dash lines in Figs. 1 and 4, and when connected in the trolley system adopts the shape shown in the full lines, the runner member portions 90 and the insulating runner members 30 associated therewith at the two ends of the body member may be initially positioned so that the ends adjacent the end members 18 are slightly depressed, or the other ends slightly raised. Upon the connection of the trolley wire 12 to the body member 16, the body member will be deformed, and the runner members at each end of the body member will be brought into alignment with each other, providing a smooth surface for guiding a current collector therealong.

From the above description, taken in connection with the accompanying drawings, it will be apparent that by my invention I have provided in a simple and effective manner for neutralizing the harmful effects of deformation in the body member of a trolley fixture so as to provide a smooth underrun for guiding a current collector. By positioning the insulating member and supporting it in floating relation relative to the body member in the manner herein disclosed, and using a metallic body member for resisting the stresses exerted by the trolley wire in a continuous trolley wire insulated crossing fixture, I have reduced the mechanical stresses normally incident to the insulating member, and have thereby greatly increased the life thereof. By providing renewable wear members having portions thereof interlocking with portions of the body member, the installation and replacement of the wearing parts is greatly facilitated, and the cost of installation and servicing are correspondingly reduced.

Since certain changes may be made in the above description, and different embodiments of the invention may be made without departing from the scope thereof, it is intended that all the matter contained in the above description, or shown in the accompanying drawings, shall be considered as illustrative, and not in a limiting sense.

I claim as my invention:

1. The combination in an insulated trolley crossing fixture, of an elongated metallic body member having a trolley wire channel for receiving a continuous trolley wire, approach members secured to the body member adjacent the ends to secure the trolley wire in operating relation therewith, an insulating member secured to the body member, an adjustable crossing member pivotally mounted on the insulating member, an insulating runner member positioned on the lower side of the body member each side of the crossing member, and a renewable metallic wear member secured to the body member adjacent each end so as to secure the insulating runner member to the body member.

2. A trolley fixture for use in an overhead trolley system comprising, an elongated body member, end members for securing a trolley wire thereto, a plurality of renewable runner members secured to one side of the body member for guiding a current collector, and means integral with the body member for initially positioning the runner members in predetermined misalignment relative to each other so that the runner members are in the proper alignment when the body member is deformed by the strain caused by the trolley wire being secured thereto.

3. The combination in a trolley fixture for an overhead trolley system, of an elongated body member, a plurality of separate runner members positioned along the body member for guiding a current collector therealong, means adjacent an end of the body member for securing a trolley wire thereto in alignment with the runner members, and means on said body member adjacent the ends of the said runner members for so positioning the runner members in fixed relation to the body member as to provide an initial misalignment of the runner members relative to each other to compensate for deformation of the body member under the stress applied thereto by the trolley wire.

4. The combination in an insulated trolley crossing fixture, of a crossing runner member for one trolley wire, an arched metallic body member adapted to be secured to the other trolley wire and provide for carrying the said other trolley wire over the said one trolley wire, an insulating member interposed between the body member and the crossing runner member, renewable wear members positioned on the lower side of the body member, and means for securing the wear members to the body member to provide an initial vertical compensating angle between the wear members so that the wear members will be in alignment when the body member is deformed by the tension of the trolley wire secured thereto.

5. The combination in a trolley fixture for use with a continuous trolley wire, of an elongated body member having an arched channel on the upper side for receiving the trolley wire, means attached to the body member adjacent the ends to secure the trolley wire to the body member, a plurality of renewable runner members positioned on the lower side of the body member, means adjacent one end of the runner members for interlocking with a portion of the body member, and means for securing the other ends of the runner members to the body member.

6. The combination in an insulated crossing fixture for a pair of trolley wires, of an elongated arched body member for receiving one of the trolley wires to carry it over the other, means adjacent the ends of the body member for securing the said one trolley wire in operating relation thereto, a trolley crossing member having a groove for receiving the said other trolley wire, an insulating member interposed between the trolley crossing member and the body member, insulating runner members positioned on the lower side of the body member, and renewable metallic wear members positioned in juxtaposition to the insulating runner members having means for supporting the insulating runner members and the insulating member.

7. An insulated trolley crossing fixture comprising, an elongated body member having an uppardly bowed channel on the upper face for receiving a trolley wire, end members attachable to the body member for securing the said trolley wire thereto, an insulating member secured to the lower side of the body member, a trolley crossing member positioned on the lower side of the insulating member for receiving a crossing trolley wire, insulating runner members positioned on each side of the trolley crossing member for guiding a current collector along the body member, and renewable metallic runner members secured to the body member adjacent each end to secure the insulating runner members in position.

8. An adjustable insulated crossing fixture for a pair of continuous intersecting trolley wires comprising, an elongated arched body member having an upwardly bowed channel for receiving one of the trolley wires, approach members secured to the body member adjacent the ends to secure the trolley wire in the said channel, an insulating member positioned on the lower side of the body member, an adjustable crossing member positioned on the insulating member having a groove for receiving the second of said trolley wires, guide runner members secured to the insulating member to maintain the crossing member in operating relation with the body member, insulating runner members positioned adjacent the guide runner members, and renewable metallic wear members secured to the body member adjacent the insulating runner members for securing the insulating runner members in position.

9. An adjustable insulated trolley crossing fixture for a pair of intersecting trolley wires comprising, an elongated metallic body member having an upwardly bowed channel for receiving one of the trolley wires, means adjacent the ends of the body member for drawing the trolley wires downwardly into the channel, an insulating member secured to the lower side of the body member, a wear bushing positioned in the insulating member, a trolley crossing member having a groove for receiving the other of the trolley wires pivotally mounted on the insulating member by the wear bushing, renewable metallic wear runner members positioned on the lower side of the body member for guiding a current collector therealong, means securing the runner members and the insulating member to the body member, and means on the runner members supporting the insulating member.

10. In a trolley crossing fixture the combination, of an arched channel-shaped body member, means adjacent the ends of the body member to secure a trolley wire in the channel, a trolley crossing member having a groove for receiving a crossing trolley wire, an insulating member positioned between the body member and the trolley crossing member, guide members secured to the insulating member at each side of the trolley crossing member, insulating runner members in juxtaposition to the guide members, and renewable metallic wear members secured to the body member cooperative with the guide members to secure the insulating runner members in position.

11. An adjustable insulated trolley crossing fixture comprising, a substantially rigid channel-shaped metallic body member, means attached to the body member to secure a trolley wire in the channel, a trolley crossing member for positioning a trolley wire disposed to cross the first-mentioned trolley wire, an insulating member interposed between the trolley crossing member and the body member, an insulating runner member positioned beneath the body member on each side of the trolley crossing member, a renewable metallic runner member positioned adjacent each insulating runner member to secure the insulating runner member in position, and, means securing the metallic wear members, insulating member and the insulating runner members to the body member.

RAYMOND P. HANNA.